Patented Jan. 16, 1923.

1,442,339

UNITED STATES PATENT OFFICE.

PAUL HILDEBRANDT, OF HAMBURG, GERMANY, ASSIGNOR, BY MESNE ASSIGNMENTS, TO THE CHEMICAL FOUNDATION, INC., A CORPORATION OF DELAWARE.

PROCESS OF TREATING ALBUMENOUS ANIMAL WASTE.

No Drawing.  Application filed December 26, 1917.  Serial No. 208,862.

*To all whom it may concern:*

Be it known that I, PAUL HILDEBRANDT, a citizen of the Empire of Germany, residing at Hamburg, Germany, have invented new and useful Improvements in a Process of Treating Albumenous Animal Waste, of which the following is a specification.

It is known that albumenoid matter is converted into the soluble state by boiling with acid liquors. Heretofore that reaction has been mainly applied to casein-products, which were either in the wet or dry state.

The conversion of albumenous animal waste into soluble albumen or albumenoid products by boiling with acid liquors has never been applied for practical purposes, because that conversion can only be carried out with profit by taking special precautions. If the boiling with acid liquors be applied to waste meat, the result is altogether unsatisfactory, because glue-like products are formed, containing great quantities of water and which are altogether unsuitable for human food preparations.

I have now found, that the drawback mentioned can be overcome by the use of definite quantities of water in combination with the gradual addition of the waste meat, so that fresh quantities of waste meat are not added to the acid liquor until the former quantity of meat has been dissolved. One may also take from the very beginning very large quantities of water and proceed as usual. The quantity of water must at least amount to several times that of the dry albumen contained in the waste meat.

In this way soluble albumen preparations suitable for human food can be obtained by neutralizing and boiling down the acid solutions, preferably in vacuo. These extracts resemble the well known Liebig's meat-extracts of the trade, and sometimes even surpass them in palatability. The invention therefore consists in the preparation of meat-extract like preparations from animal waste. It is not necessary to use waste meat as a raw material for the meat-extract preparations, but such albumenoid matter, like cartilage, sinews, horn, hair, skins and the like can be used with perfect success, which have hitherto never been applied for human food. I consider the utilization of the products for human food preparations as a great progress in the art.

The success of the process also depends to a certain degree upon the concentration of the acid liquor. If strong acid be taken the time of boiling is reduced, whereas for weak acid a long continued boiling becomes necessary for bringing the albumen into solution. The time for treatment may also be reduced by boiling the mass with the acid liquor under increased pressure.

What I claim is:—

1. In the herein described process of treating albumenous animal matter, the step which consists in successively introducing quantities of such matter into boiling acid liquors, each quantity of matter being permitted to dissolve before introducing the next succeeding quantity.

2. The herein described process of treating albumenous animal matter, consisting in boiling a quantity of acid liquor several times greater than the quantity of dry albumen contained in the matter to be treated, and thereafter successively introducing quantities of such matter into the boiling liquor, each quantity of matter being permitted to dissolve before introducing the next succeeding quantity.

In testimony whereof I have signed my name to this specification in the presence of two subscribing witnesses.

PAUL HILDEBRANDT.

Witnesses:
 EDUARD LIEBAUR,
 WALTER AHRENS.